US009414416B2

(12) United States Patent
Adarapu et al.

(10) Patent No.: US 9,414,416 B2
(45) Date of Patent: Aug. 9, 2016

(54) LOCATION AWARE CAPTIVE GUEST PORTAL

(71) Applicant: Cisco Technology, Inc., San Jose, CA (US)

(72) Inventors: Reddy Babu Adarapu, Santa Clara, CA (US); Ravi Akireddy, Santa Clara, CA (US); Uday Kumar Pyda, Fremont, CA (US); Radhakrishnan Sethuraman, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 201 days.

(21) Appl. No.: 14/153,775

(22) Filed: Jan. 13, 2014

(65) Prior Publication Data

US 2015/0201438 A1    Jul. 16, 2015

(51) Int. Cl.

| | |
|---|---|
| *H04W 4/00* | (2009.01) |
| *H04L 12/26* | (2006.01) |
| *G06F 15/177* | (2006.01) |
| *G06Q 30/00* | (2012.01) |
| *G06F 7/04* | (2006.01) |
| *H04W 76/02* | (2009.01) |
| *H04W 64/00* | (2009.01) |
| *H04L 29/08* | (2006.01) |
| *G06Q 30/02* | (2012.01) |
| *H04W 4/04* | (2009.01) |
| *H04W 12/08* | (2009.01) |
| *H04W 84/12* | (2009.01) |

(52) U.S. Cl.
CPC ........... *H04W 76/02* (2013.01); *G06Q 30/0241* (2013.01); *H04L 67/20* (2013.01); *H04W 4/043* (2013.01); *H04W 12/08* (2013.01); *H04W 64/00* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2010/0106572 A1 | 4/2010 | van Hoff et al. | |
| 2012/0195215 A1* | 8/2012 | Jeong | H04W 64/006 370/252 |
| 2013/0262223 A1* | 10/2013 | Catane | G06Q 30/0261 705/14.53 |
| 2015/0089592 A1* | 3/2015 | Han | H04W 12/06 726/4 |

FOREIGN PATENT DOCUMENTS

WO    2008/082794 A2    7/2008

OTHER PUBLICATIONS

Paul Andor Farkas: "Alternative municipal wireless network models: Examination of grassroots and ad-based initiatives", Communications and Networking in China, 2008, CHINACOM 2008, Third International Conference on, IEEE, Piscataway, NJ, USA, Aug. 25, 2008, pp. 1324-1329.
International Search Report for PCT/US2015/011222, Apr. 9, 2015.

* cited by examiner

*Primary Examiner* — Kiet Tang
(74) *Attorney, Agent, or Firm* — Patterson + Sheridan, LLP

(57) ABSTRACT

Techniques for providing a location-aware captive guest portal are described. Embodiments include receiving, from a client device, a request to access a wireless network for a physical environment, the network comprising a plurality of wireless access points configured to provide a common network. A physical location of the client device is then determined within the physical environment. Embodiments also determine a location profile corresponding to the physical location of the client device. The request to access the wireless network is then processed using a captive guest portal selected based on the determined location profile.

17 Claims, 6 Drawing Sheets

LOCATION AWARE CAPTIVE GUEST PORTAL

TECHNICAL FIELD

Embodiments presented in this disclosure generally relate to wireless networking, and more specifically to a captive guest portal capable of selectively handling requests based on a physical location of a client device.

BACKGROUND

Wireless networks such as wireless local area networks (WLANs) are quickly becoming pervasive, and WLANs that conform to the IEEE 802.11 standard are particularly ubiquitous. A WLAN can be made up of one or more wireless access points. A wireless access point is generally a device that enables wired communication devices (e.g., network devices) to connect to and to transmit data through a wireless network using wireless technologies (e.g., Wi-Fi, Bluetooth, or related standards). For example, an access point could connect to a network device (e.g., an edge device) and could relay data between wireless client devices (e.g., personal computers, printers, mobile devices, etc.) and the network device. The access point could also be combined with a wireless network device, such as in a wireless router.

Generally, a given access point will have a fixed area in which it can provide an acceptable signal strength. In order to create a WLAN spanning a larger area, network engineers will oftentimes use multiple access points in a wired network in order to provide wireless access to client devices within the larger area. The access points within the WLAN may work in conjunction to provide network access for the client devices, and may be managed by a WLAN controller. The WLAN controller generally performs management functions for the plurality of access points within the wireless network, e.g., automatic adjustments to radio frequency (RF) power, channels, authentication, and/or security associated with the access points.

In many cases, wireless networks are deployed in areas too large to be covered by a single wireless access point. That is, a single wireless access point is generally capable of providing network access for a fixed area. As the area covered by the wireless network increases, so does the number of access points and the difficulty of arranging and managing the access points. To assist network engineers in managing such networks, a position map may be created, e.g., using blueprints or other drawings of a facility. Such a position map may specify, for example, a physical position of each of the access points within the physical environment. A network engineer could then use such a map for RF coverage optimization functions, such as defining optimal channels and power level selection for each of the access points, as well as WLAN location-based services such as client device tracking. The position map may be created manually by a network administrator importing a set of floor plans and manually selecting access point locations within the map corresponding to the physical access points within the physical environment.

Many public networks utilize a captive guest portal system in which guests are authenticated and are authorized to use the network. For example, a captive guest portal could require that the user authenticate his identity by means of an ID number (e.g., a room number for a hotel). As another example, the captive guest portal could authorize the user to access the network only after the user has accepted an agreement specifying terms and services of using the network. Oftentimes, it is desirable to create multiple guest portals for a physical environment, so that each of the guest portals can be tailored to their respective physical environment. For example, in a department store, a "men's department" could include a guest portal having a visual theme and advertisements targeted at male shoppers, while the "women's department" could include another guest portal having a different visual theme and advertisements targeted at female shoppers. However, this is current accomplished by using multiple guest portals throughout the physical environment, thus creating multiple separate networks within the physical environment.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION OF EXAMPLE EMBODIMENTS

Overview

Figure 1:
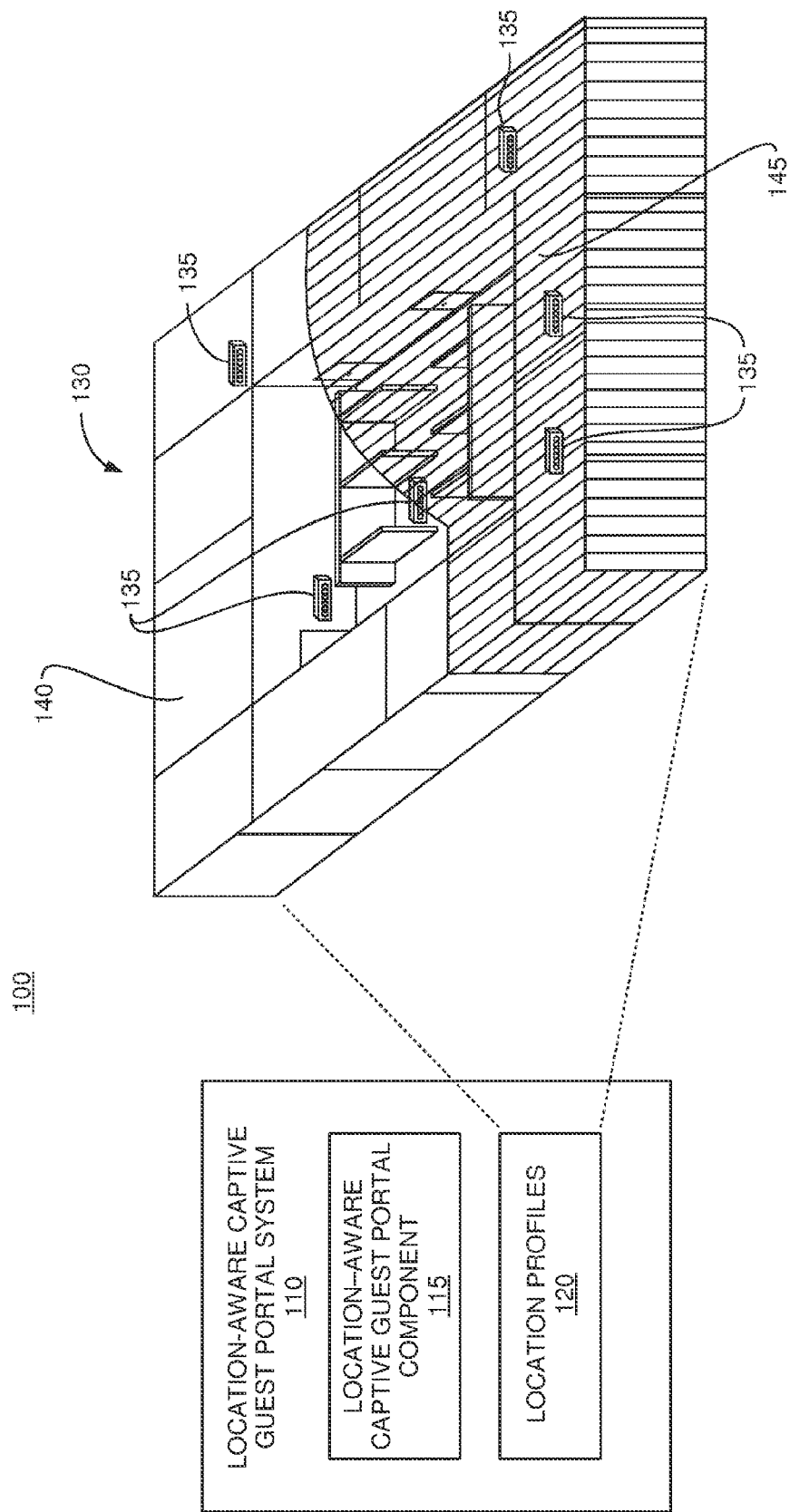
FIG. 1 illustrates an interaction between a location-aware captive guest portal component and a physical environment, according to one embodiment described herein.

Embodiments provide a method, system and computer-readable medium that include receiving, from a client device, a request to access a wireless network for a physical environment. Here, the network includes a plurality of wireless access points configured to provide a common network. Embodiments also determine a physical location of the client device within the physical environment. Additionally, embodiments determine a location profile corresponding to the physical location of the client device. Embodiments further process the request to access the wireless network using a captive guest portal selected based on the determined location profile.

Example Embodiments

Generally, embodiments provide techniques for providing a location-aware captive guest portal capable of processing client requests to access the network in different ways, based on the client's current physical location. For instance, embodiments can receive a request from a client device to access a wireless network for a physical environment. Such a network can be made up of multiple wireless access points that are configured to provide a common network. Additionally, the request could be a request from a client device has not yet been authenticated and authorized to access the network.

Embodiments can then determine a physical location of the client device within the physical environment. For example, measures of signal strength between the client device and two or more of the wireless access points could be determined, and these measures of signal strength could be used (e.g., together with data specifying physical positions of the wireless access points within the physical environment) to determine the client device's position within the physical environment.

Once the client's position is determined, embodiments determine a location profile corresponding to the physical location of the client device. Generally, the physical environment can be divided into two or more distinct areas (or zones), where each of the two or more areas is associated with a respective location profile. The location profiles generally specify data that is used to tailor the appearance and/or behavior of the captive guest portal. The client's request to access the wireless network is then processed using a captive guest portal selected based on the determined location profile.

For example, a wireless network could be provided for a department store using multiple wireless access points, and a first zone could be defined as the physical area encompassing the men's department of a department store, while a second zone could be defined as the physical area encompassing the women's department of the department store. Here, if a location-aware captive guest portal component receives a request to access the network from a client device, and determines that the client device is located within the first zone (i.e., the zone encompassing the men's department), the location-aware captive guest portal component could retrieve a location profile associated with the first zone and could process the request using a guest portal as defined by the location profile. For example, the guest portal used to process the request could include web pages having a theme tailored to the men's department of the store, and could include advertisements directed to the target audience of the men's department. Doing so provides a single, common network for a physical environment, in which requests from client devices are processed differently, depending on the client's physical location within the physical environment.

FIG. 1 illustrates an interaction between a location-aware captive guest portal component and a physical environment, according to one embodiment described herein. As shown, the system 100 includes a location-aware captive guest portal system 110 and a physical environment 130. The location-aware captive guest portal system 110 includes a location-aware captive guest portal component 115 and location profiles 120. Additionally, the physical environment 130 is made up of a number of different wireless access points 135. Additionally, the physical environment 130 as shown is divided into two distinct zones 140 and 145, as shown by the shaded and unshaded portions of the physical environment 130.

Here, the location-aware captive guest portal component 115 could receive a request to access the network from a client device within the physical environment 130. The location-aware captive guest portal component 115 could then determine the physical location of the client device within the physical environment 130. For example, the location-aware captive guest portal component 115 could determine a measure of signal strength between the client device and two or more of the access points 135. The location-aware captive guest portal component 115 could then retrieve data specifying the physical positions of the wireless access points 135 (e.g., as coordinates) and could use this data, together with the measures of signal strength, to triangulate the client device's position within the physical environment 130. More generally, however, any technique for determining the client device's physical position can be used, consistent with the functionality described herein.

Upon determining the client device's position, the location-aware captive guest portal component 115 determines which of the zones 140 and 145 the position corresponds to. Of note, while only two zones 140 and 145 are shown, such a depiction is for illustrative purposes only, and more generally embodiments may be configured to utilize any number of distinct zones. Once the location-aware captive guest portal component 115 determines the zone that the client device's position corresponds to, the location-aware captive guest portal component 115 processes the client device's request to access the network based on a zone profile corresponding to the determined zone. For example, the location-aware captive guest portal component 115 could be configured to display a web page(s) for a captive guest portal having a stylistic theme and advertisements selected based on the determined zone profile.

Figure 2:
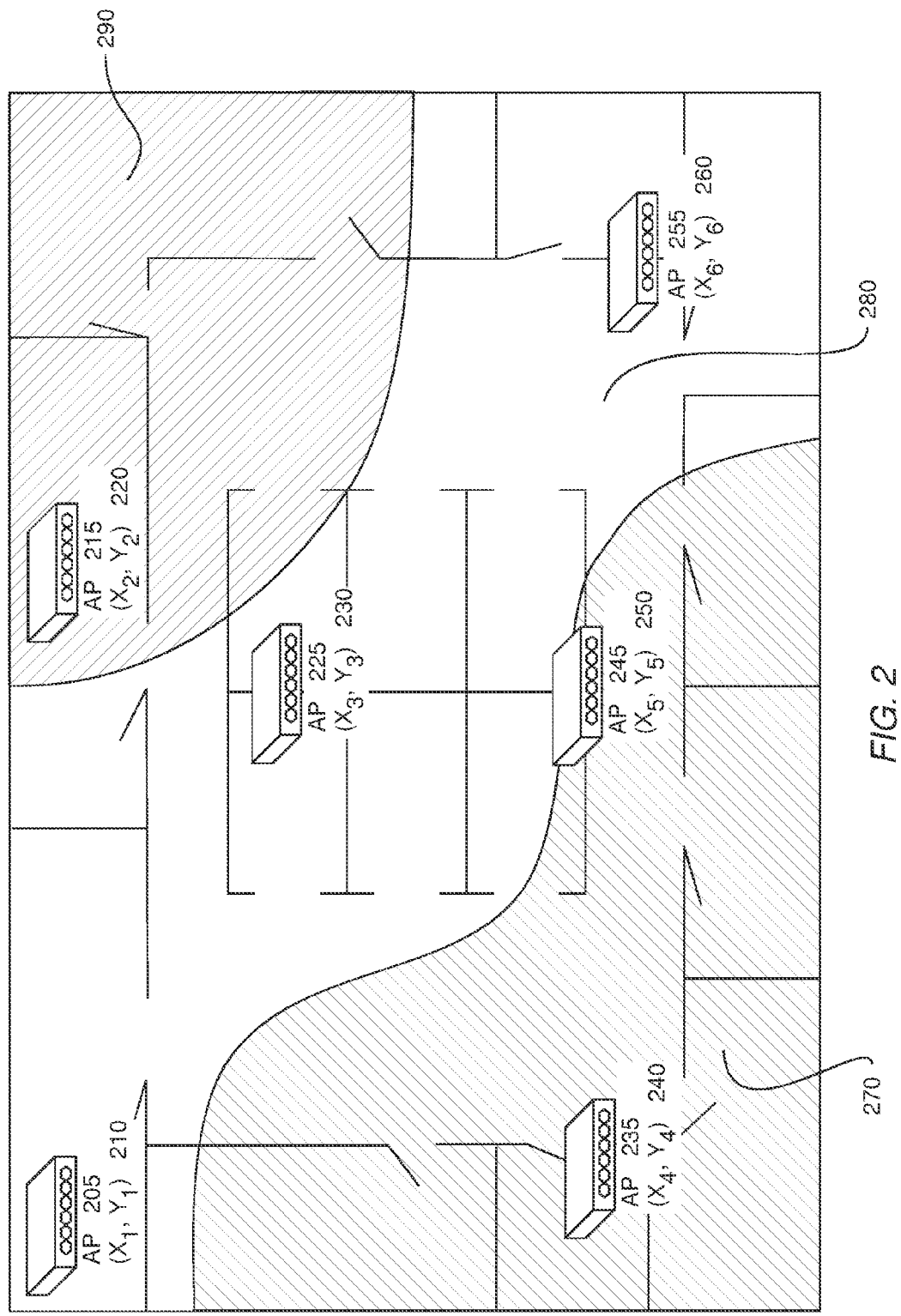
FIG. 2 illustrates a wireless network for a physical environment divided into multiple zones, according to one embodiment described herein.

Another example is shown in FIG. 2 illustrates a wireless network for a physical environment divided into multiple zones, according to one embodiment described herein. As shown, the diagram 200 illustrates a physical environment configured with wireless access points 205, 215, 225, 235, 245 and 255 that are positioned at coordinates 210, 220, 230, 240, 250 and 260, respectively. Additionally, the physical environment has been divided into three separate regions 270, 280 and 290, as represented by the various shaded and unshaded regions.

As an example, the depicted physical environment represent a department store, where the region 270 is the children's department, the region 280 is the women's department and the region 290 the men's department. Additionally, each of these regions can be associated with a respective location profile, which specifies how requests to access the network originating in the respective region should be handled. For example, the location profile for the men's department could specify that requests originating from the region 290 should be processed with a captive guest portal having a particular stylistic theme and included a number of advertisements directed at male shoppers. As another example, the location profile for the children's department 270 could specify that a toy-themed guest portal should be used for requests originating from the children's department, and could include a short video file of a preview of an upcoming children's movie. More generally, however, it is broadly contemplated that the location profiles can specify any content, traits, characteristics or behaviors that can be reflected in a web page(s) that make up the captive guest portal.

Figure 3:
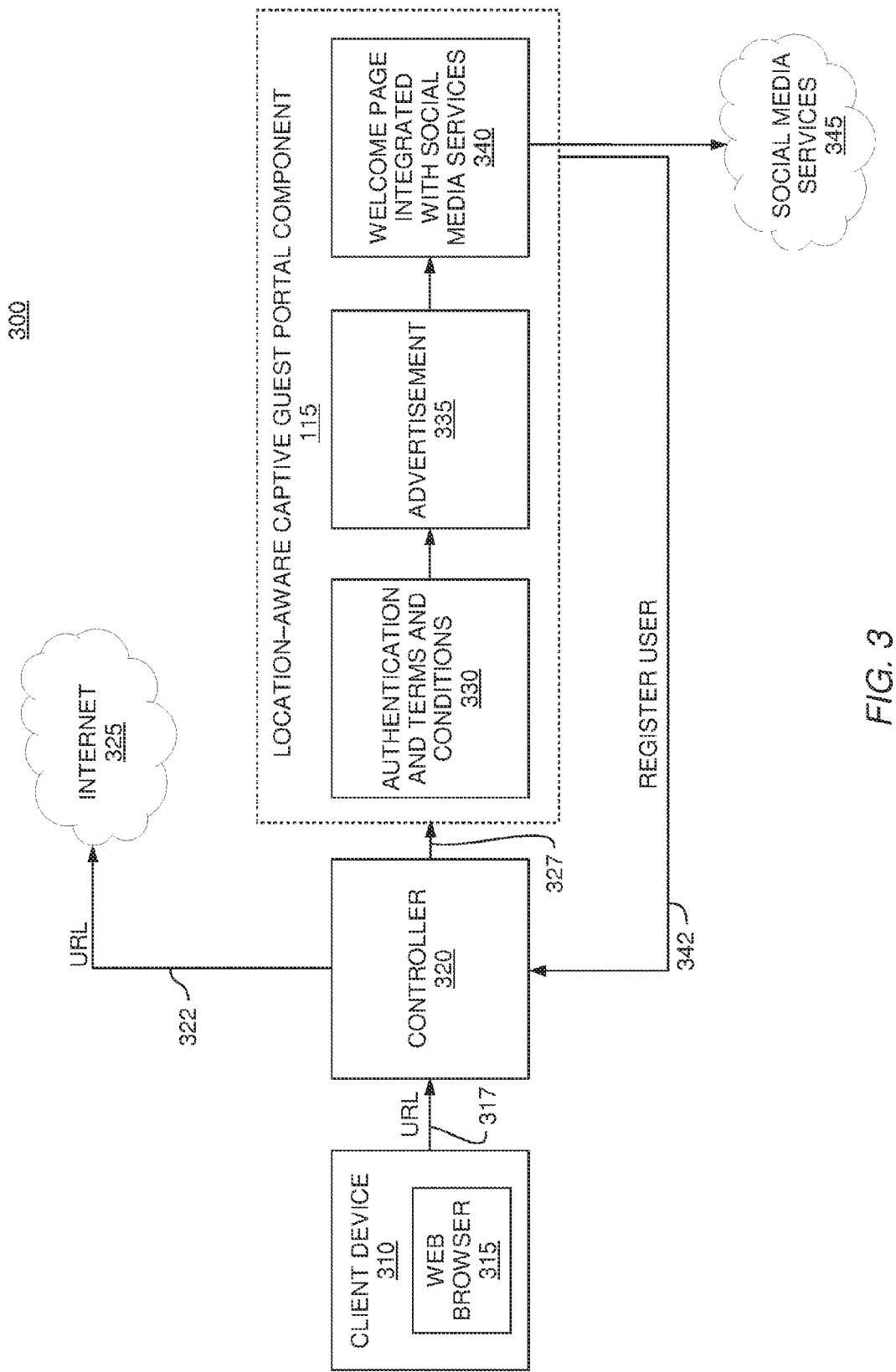
FIG. 3 is a flow diagram illustrating a method for processing a client request for a URL, according to one embodiment described herein.

FIG. 3 is a flow diagram illustrating a method for processing a client request for a URL, according to one embodiment described herein. As shown, the diagram 300 illustrates interactions between a client device 310, a controller unit 320 and a location-aware captive guest portal component 115. As shown, the client device 310 includes a web browser 315. For example, the client device 310 could represent a mobile device, a portable computer, and so on.

Here, the client device 310 initiates a request for a URL to the controller component 320 over a wireless network (element 317). Upon receiving the request, the controller component 320 redirects the request from the client device 310 to the location-aware captive guest portal component 115 for processing (element 327). As discussed above, the location-aware captive guest portal component 115 can determine a physical location of the client device 310. Generally, any technique for determining a device's position can be used, consistent with the functionality described herein. Examples of such techniques include determining global positioning system (GPS) coordinates corresponding to the client device, triangulating the client device's position based on measures of signal strength between the client device and wireless access points within the network, and so on.

Upon determining the client device's 310 position, the location-aware captive guest portal component 115 can determine a region within the physical environment corresponding to the determined position, and can select a region profile corresponding to the region for use in registering the client device. For instance, the location-aware captive guest portal component 115 can present the client device 310 with one or more web pages for use in authenticating the client device 310, based on the determined region profile (element 330). Likewise, the location-aware captive guest portal component 115 transmits a region-based advertisement to the client device 310, based on the region profile (element 335). The location-aware captive guest portal component 115 can also transmit a welcome page integrated with social media services to the client device 310 that is specific to the determined region where the client device is located (element 340). Here, authentication information from the client device 310 could be used to access information from one or more social media services 345, and this retrieved information could be displayed within the welcome page.

The location-aware captive guest portal component 115 then registers the client device 310 (element 342), so that future requests for URLs from the client device 310 can be processed without having to re-authenticate and re-authorize the client device 310. Thus, if the location-aware captive guest portal component 115 determines that the client is already registered with the guest portal (e.g., from a previous session with the client device 310), the location-aware captive guest portal component 115 can proceed to displaying advertisements (element 335) and a welcome page (element 340), without re-authenticating the client device 310 (element 330). The controller component 320 then processes the request for the specified URL and retrieves web page data corresponding to the URL from the Internet 325 (element 322).

Figure 4:
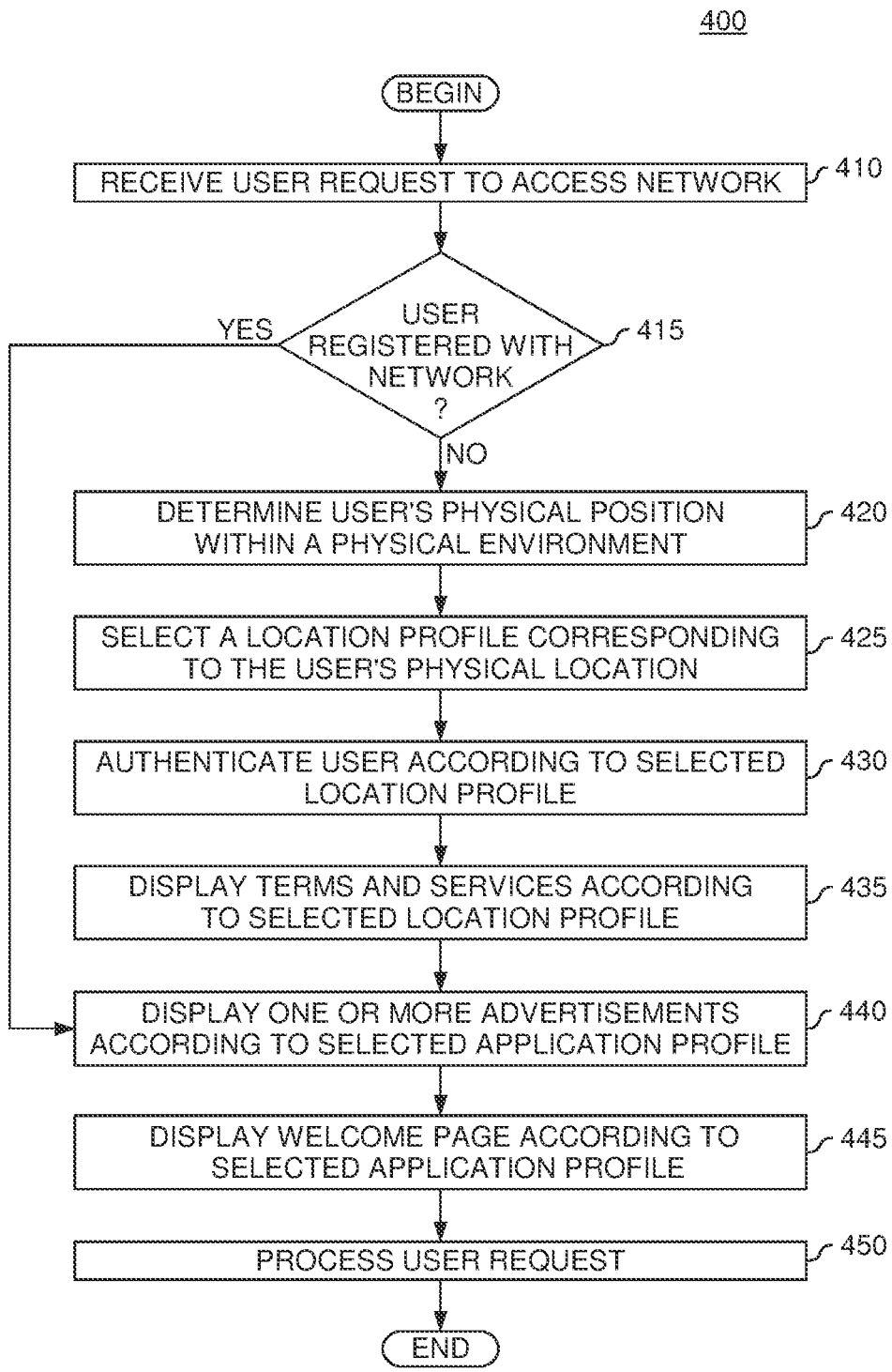
FIG. 4 is a flow diagram illustrating a method for processing a user request to access a network, according to one embodiment described herein.

FIG. 4 is a flow diagram illustrating a method for processing a user request to access a network, according to one embodiment described herein. As shown, the method 400 begins at block 410, where the location-aware captive guest portal component 115 receives a request to access a network from a client device. The location-aware captive guest portal component 115 next determines whether the client device is already registered with the network (block 415). For example, the location-aware captive guest portal component 115 can authenticate the client device and can determine whether the client device is authorized to access the network.

If the location-aware captive guest portal component 115 determines the client device is already registered with the network, the location-aware captive guest portal component 115 processes the user request (block 440), where the location-aware captive guest portal component 115 transmits one or more advertisements (e.g., included within one or more web pages) to the client device for display, the advertisements selected based on a location profile corresponding to the client device's physical location. The location-aware captive guest portal component 115 in the method 400 also transmits a welcome page (e.g., made up of one or more web pages) to the client device for display, the welcome page selected based on the location profile. The location-aware captive guest portal component 115 then processes the request from the client device (block 450). For example, if the request from the client device specifies a particular URL, the location-aware captive guest portal component 115 could forward the request on to a controller component which retrieves content from the specified URL and returns the content to the client device. Once the user request is processed, the method 400 ends.

If the location-aware captive guest portal component 115 determines the client device is not yet registered with the network, the location-aware captive guest portal component 115 determines the client's physical location within the physical environment (block 420). For instance, the location-aware captive guest portal component 115 could request the client device's position from a network component configured to calculate and return the client device's position. In one embodiment, the position is calculated using the method 500 shown in FIG. 5 and discussed below.

Once the physical location is determined, the location-aware captive guest portal component 115 selects a location profile that corresponds to the determined location (block 425). For instance, in an embodiment configured to provide a common network for a hotel, the location-aware captive guest portal component 115 could be configured with one profile for the restaurant area of the hotel and could be configured with a different profile for the pool area of the hotel. More generally, the physical environment can be subdivided using any number of different profiles, according to the functionality described herein.

The location-aware captive guest portal component 115 then authenticates the client device based on the selected location profile (block 430). For instance, the location profile could specify a particular visual theme should be applied to a web page used for authenticating the client device. Continuing the above example, a web page having a dining theme could be provided to a client device in the restaurant area of the hotel as part of authenticating the client device, while a different client device in the pool area of the hotel could be provided with a beach-themed web page for use in inputting authentication information.

In the depicted embodiment, the location-aware captive guest portal component 115 also displays terms and services according to the selected location profile (block 435). Here, the business may wish to have customers agree to particular terms and conditions in one physical area (e.g., the hotel restaurant), while having other customers in a different physical area agree to additional terms and conditions (e.g., the pool area). Accordingly, the location profile for each of the locations could specify the terms and services (e.g., by way of specifying a web page to transmit to the client device) to use for client devices within the corresponding physical area.

Additionally, the location-aware captive guest portal component 115 in the method 400 displays one or more advertisements to the client device, based on the determined location profile (block 440). As examples, the advertisement(s) could be in the form of a video file streamed to the client device for playback, or could be in the form of one or more banner advertisements within a web page transmitted to the client device. In the depicted embodiment, the location-aware captive guest portal component 115 then displays a welcome page to the client device, based on the selected location profile (block 445). For example, a dining-themed welcome page could be displayed to client devices located within the restaurant area of a hotel, while a pool-themed welcome page could be displayed to client devices located within the pool area of the hotel.

The location-aware captive guest portal component 115 then processes the user request to access the network (block 450), and the method 400 ends. For instance, the location-aware captive guest portal component 115 could forward the request on to a controller component which is configured to fetch a web page associated with a URL specified in the user request and to return the web page to the client device. The location-aware captive guest portal component 115 can also register the client device with the network at least for a predetermined amount of time, so that future requests for URLs originating from the client device are processed without repeating blocks 420-445.

As discussed above, embodiments may be configured to utilize any technique suitable for determining a client device's physical position within a physical environment. For example, in one embodiment, the location-aware captive guest portal component 115 could request GPS coordinates from a GPS-configured client device, and could use the GPS coordinates to determine the client device's position within the physical environment. However, one limitation to such a technique is that some client devices may not be configured with GPS receivers and thus are unable to provide their GPS coordinates.

Figure 5:
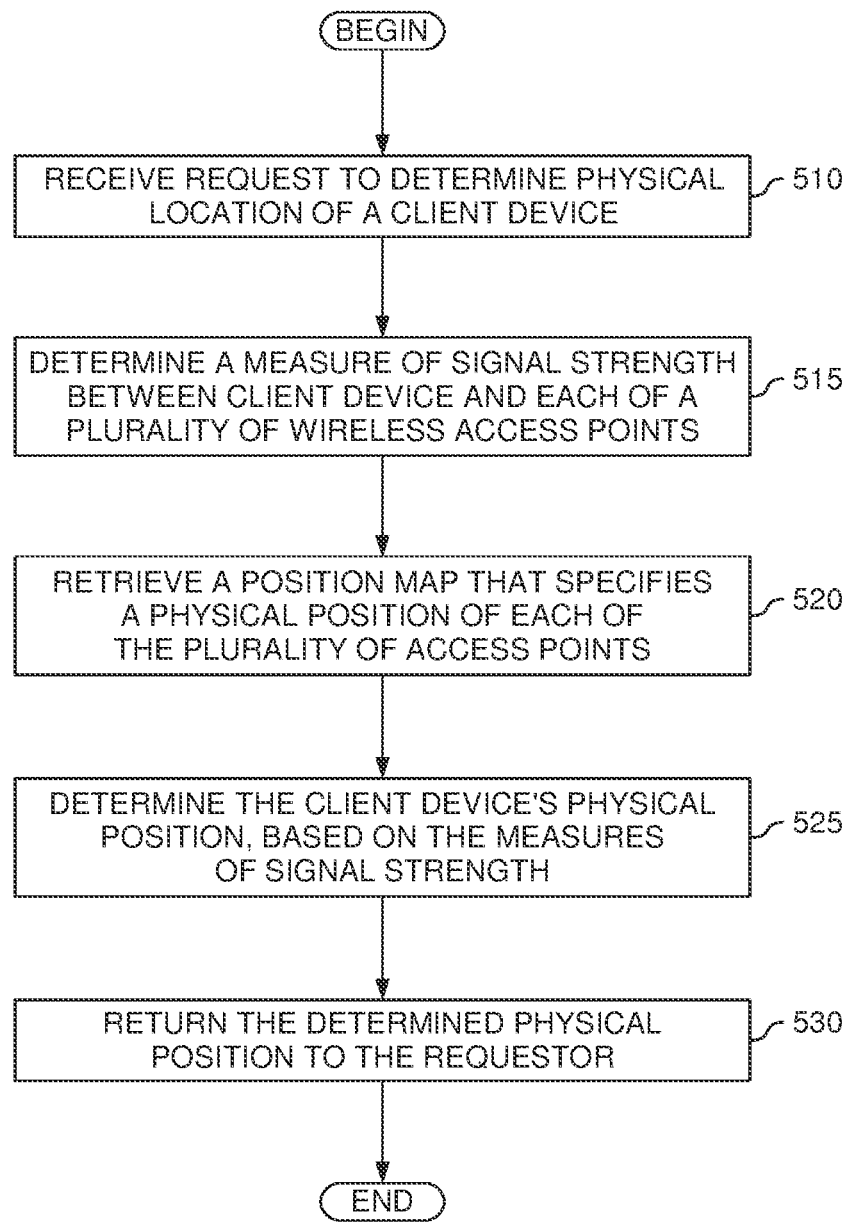
FIG. 5 is a flow diagram illustrating a method for determining a physical position of a client device, according to one embodiment described herein.

A particular technique for determining the client device's location is described in FIG. 5, which is a flow diagram illustrating a method for determining a physical position of a client device, according to one embodiment described herein. As shown, the method 500 begins at block 510, where the location-aware captive guest portal component 115 receives a request to determine a client device's physical location. The location-aware captive guest portal component 115 then determines a measure of signal strength between the client device and each of a plurality of wireless access points (block 515). Here, the location-aware captive guest portal component 115 could use all of the wireless access points within the network or could use a subset of wireless access points within the network (e.g., a predetermined number of wireless access points having the greatest measures of signal strength, all wireless access points having a measure of signal strength greater than a predetermined threshold amount of signal strength, etc.).

Additionally, the location-aware captive guest portal component 115 retrieves a position map data structure that specifies a physical position of each of the wireless access points within the physical environment (block 520). For example, the physical positions of the wireless access points could be specified using coordinates (e.g., X and Y coordinates or X, Y and Z coordinates). The location-aware captive guest portal component 115 then determines the client device's physical position, using the position map data structure and the measures of signal strength (block 525). For example, the location-aware captive guest portal component 115 could determine that the client device is closer to a particular wireless access point when the measure of signal strength is higher, and could determine that the client device is further from a particular wireless access point when the measure of strength is lower. Once the position is determined, the location-aware captive guest portal component 115 returns the position to the requestor (block 530), and the method 500 ends. For instance, the method 500 could be performed by a sub-component of the location-aware captive guest portal component 115. In one embodiment, the location-aware captive guest portal component 115 is configured to request the client device's position from a location determination component and the method 500 can be performed by such a location determination component.

Figure 6:
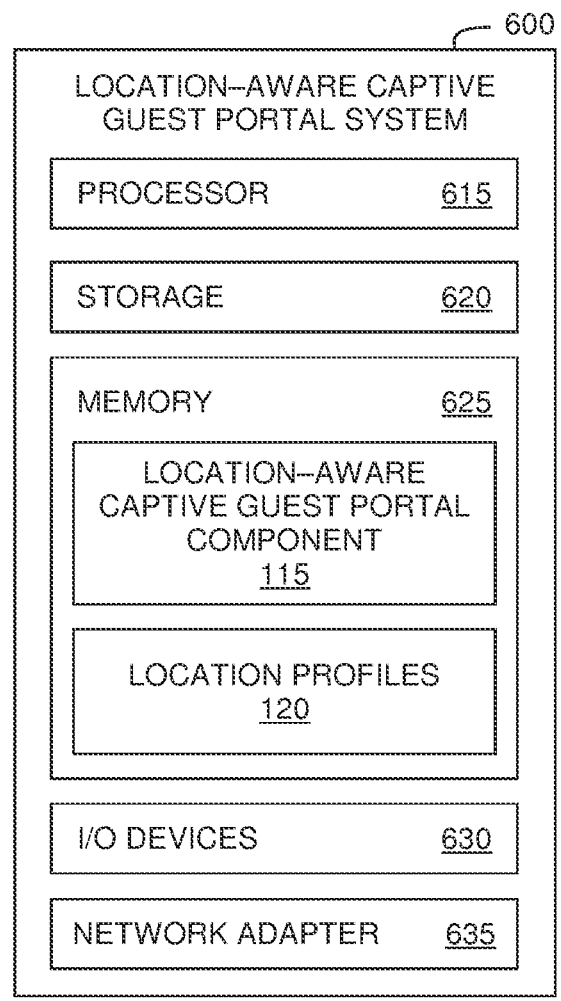
FIG. 6 is a block diagram illustrating a system configured with a location-aware captive guest portal component, according to one embodiment described herein.

FIG. 6 is a block diagram illustrating a system configured with a location-aware captive guest portal component, according to one embodiment described herein. The location-aware captive guest portal system 600 includes a processor 615, storage 620, memory 625, input/output (I/O) devices 630 and a network adapter 635. The processor 615 may be any processing element capable of performing the functions described herein. The processor 615 represents single processor, multiple processors, a processor with multiple cores, and combinations thereof. Storage 620 represents any non-volatile memory (e.g., a disk drive) on the position map analysis system 600 or accessible by the location-aware captive guest portal system 600.

The memory 625 may be either volatile or non-volatile memory and include, RAM, flash, cache, disk drives and the like. Although shown as a single entity, the memory 625 may be divided into different memory storage elements such as RAM and one or more hard disk drives. Here, the memory 625 includes a location-aware captive guest portal component 115 and location profiles 120. The network adapter 635 facilitates communication between the position map analysis system 600 and a network. Here, the network is representative of any data communications network on which the position map analysis system could transmit data, including wired networks, wireless networks, etc. Examples of the network include a local area network, the Internet, a Bluetooth® communication link, and so on.

As discussed above, the location-aware captive guest portal component 115 can receive a request from a client device to access a wireless network for a physical environment. Here, the network is made up of a plurality of wireless access points configured to provide a common network. The location-aware captive guest portal component 115 can then determine a physical location of the client device within the physical environment. For example, the location-aware captive guest portal component 115 could be configured to triangulate the position of the client device, based on a measure of signal strength between the client device two or more of the wireless access points as well as data specifying a position of each of the two or more wireless access points within the physical environment. The location-aware captive guest portal component 115 can then determine a location profile corresponding to the physical location of the client device, and can process the request to access the wireless network using a captive guest portal selected based on the determined location profile. For example, the location-aware captive guest portal component 115 could authenticate and authorize the client device to access the network, using a captive guest portal having a stylistic theme and advertisements chosen based on the determined location profile. Doing so provides location-specific guest portal functionality for a single common network made up of multiple wireless access points.

Additionally, it is specifically contemplated that embodiments may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Cloud computing resources may be provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present disclosure, a location determination component could be deployed on a node located in the cloud, and could receive data specifying the physical positions of the wireless access points as well as a signal strength information between the wireless access points and a client device. The location determination component could then determine a position of the client device within the physical environment based on the position and signal strength information, and could return the determined positional information to the location-aware captive guest portal component 115 for use in processing the request to access the network. Doing so allows users to access the location determination component from any computing system connected to the cloud computing environment (e.g., via the Internet).

While the previous discussion is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   receiving, from a client device, a request to access a wireless network for a physical environment, the wireless network comprising a plurality of wireless access points configured to provide a common network;
   determining a physical location of the client device within the physical environment, comprising:
      retrieving a floor map data structure specifying a physical position of each of the wireless access points within the physical environment;
      determining a measure of signal strength between the client device and each of two or more of the plurality of wireless access points; and
      determining the physical location of the client device, based on the floor map data structure and the determined measures of signal strength;
   determining a location profile corresponding to the physical location of the client device;
   selecting one of a plurality of captive guest portals based on the determined location profile, wherein each of the plurality of captive guest portals processes requests using a distinctive theme; and
   processing the request to access the wireless network using the selected captive guest portal, wherein processing the request includes transmitting, by the selected captive guest portal, a web page corresponding to the respective theme to the client device.

2. The method of claim 1, wherein a distance between the client device and a first wireless access point of the plurality of wireless access points is determined to be inversely proportional to the measure of signal strength between the client device and the first wireless access point, such that the distance is greater when the measure of signal strength is weaker and the distance is less when the measure of signal strength is stronger.

3. The method of claim 1, wherein processing the request to access the wireless network, based on the determined location profile, further comprises:
   selecting an advertisement based on the determined location profile; and
   transmitting the selected advertisement to the client device for display.

4. The method of claim 1, wherein processing the request to access the wireless network, based on the determined location profile, further comprises:
   selecting a visual theme for use with a guest portal, based on the determined location profile; and
   transmitting data corresponding to the guest portal having the selected visual theme to the client device for display.

5. The method of claim 1, wherein determining the location profile corresponding to the physical location of the client device further comprises:
   selecting the location profile from a plurality of location profiles for the physical environment, wherein each of the plurality of location profiles corresponds to a distinct area within the physical environment, and wherein every point within the physical environment corresponds to only one of the plurality of location profiles.

6. The method of claim 1, wherein the physical location of the client device within the physical environment is not determined based on which of the plurality of wireless access points the client device is currently connected to.

7. A system, comprising:
a processor; and
a memory containing logic that, when executed by the processor, performs an operation comprising:
receiving, from a client device, a request to access a wireless network for a physical environment, the wireless network comprising a plurality of wireless access points configured to provide a common network;
determining a physical location of the client device within the physical environment, comprising:
retrieving a floor map data structure specifying a physical position of each of the wireless access points within the physical environment;
determining a measure of signal strength between the client device and each of two or more of the plurality of wireless access points; and
determining the physical location of the client device, based on the floor map data structure and the determined measures of signal strength;
determining a location profile corresponding to the physical location of the client device;
selecting one of a plurality of captive guest portals based on the determined location profile, wherein each of the plurality of captive guest portals processes requests using a distinctive theme; and
processing the request to access the wireless network using the selected captive guest portal, wherein processing the request includes transmitting, by the selected captive guest portal, a web page corresponding to the respective theme to the client device.

8. The system of claim 7, wherein a distance between the client device and a first wireless access point of the plurality of wireless access points is determined to be inversely proportional to the measure of signal strength between the client device and the first wireless access point, such that the distance is greater when the measure of signal strength is weaker and the distance is less when the measure of signal strength is stronger.

9. The system of claim 7, wherein processing the request to access the wireless network, based on the determined location profile, further comprises:
selecting an advertisement based on the determined location profile; and
transmitting the selected advertisement to the client device for display.

10. The system of claim 7, wherein processing the request to access the wireless network, based on the determined location profile, further comprises:
selecting a visual theme for use with a guest portal, based on the determined location profile; and
transmitting data corresponding to the guest portal having the selected visual theme to the client device for display.

11. The system of claim 7, wherein determining the location profile corresponding to the physical location of the client device further comprises:
selecting the location profile from a plurality of location profiles for the physical environment, wherein each of the plurality of location profiles corresponds to a distinct area within the physical environment, and wherein every point within the physical environment corresponds to only one of the plurality of location profiles.

12. The system of claim 7, wherein the physical location of the client device within the physical environment is not determined based on which of the plurality of wireless access points the client device is currently connected to.

13. A non-transitory computer-readable medium containing a program that, when executed, performs an operation comprising:
receiving, from a client device, a request to access a wireless network for a physical environment, the wireless network comprising a plurality of wireless access points configured to provide a common network;
determining a physical location of the client device within the physical environment, comprising:
retrieving a floor map data structure specifying a physical position of each of the wireless access points within the physical environment;
determining a measure of signal strength between the client device and each of two or more of the plurality of wireless access points; and
determining the physical location of the client device, based on the floor map data structure and the determined measures of signal strength;
determining a location profile corresponding to the physical location of the client device;
selecting one of a plurality of captive guest portals based on the determined location profile, wherein each of the plurality of captive guest portals processes requests using a distinctive theme; and
processing the request to access the wireless network using the selected captive guest portal, wherein processing the request includes transmitting, by the selected captive guest portal, a web page corresponding to the respective theme to the client device.

14. The non-transitory computer-readable medium of claim 13, wherein a distance between the client device and a first wireless access point of the plurality of wireless access points is determined to be inversely proportional to the measure of signal strength between the client device and the first wireless access point, such that the distance is greater when the measure of signal strength is weaker and the distance is less when the measure of signal strength is stronger.

15. The non-transitory computer-readable medium of claim 13, wherein processing the request to access the wireless network, based on the determined location profile, further comprises:
selecting an advertisement based on the determined location profile; and
transmitting the selected advertisement to the client device for display.

16. The non-transitory computer-readable medium of claim 13, wherein processing the request to access the wireless network, based on the determined location profile, further comprises:
selecting a visual theme for use with a guest portal, based on the determined location profile; and
transmitting data corresponding to the guest portal having the selected visual theme to the client device for display.

17. The non-transitory computer-readable medium of claim 13, wherein determining location profile corresponding to the physical location of the client device further comprises:
selecting the location profile from a plurality of location profiles for the physical environment, wherein each of the plurality of location profiles corresponds to a distinct area within the physical environment, and wherein every point within the physical environment corresponds to only one of the plurality of location profiles.

* * * * *